Nov. 10, 1931.                J. DOYON, JR                1,830,827
                                CALIPERS
                           Filed Aug. 13, 1928
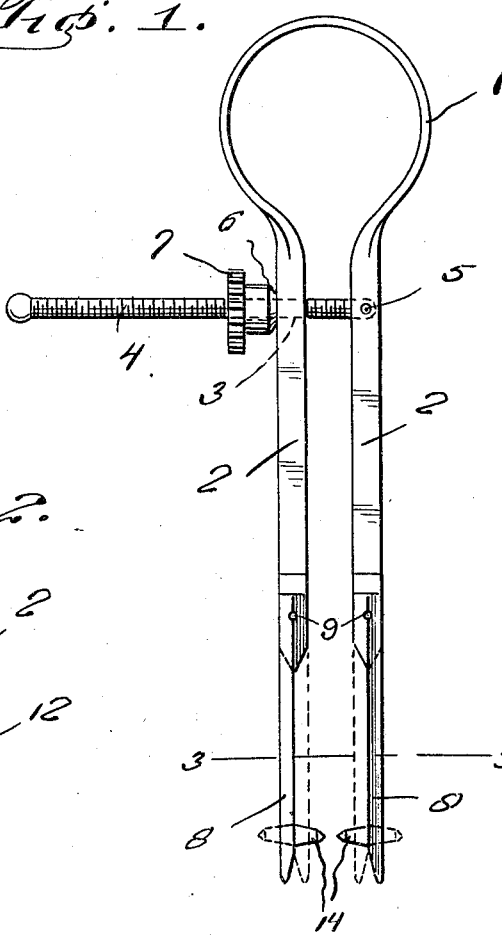
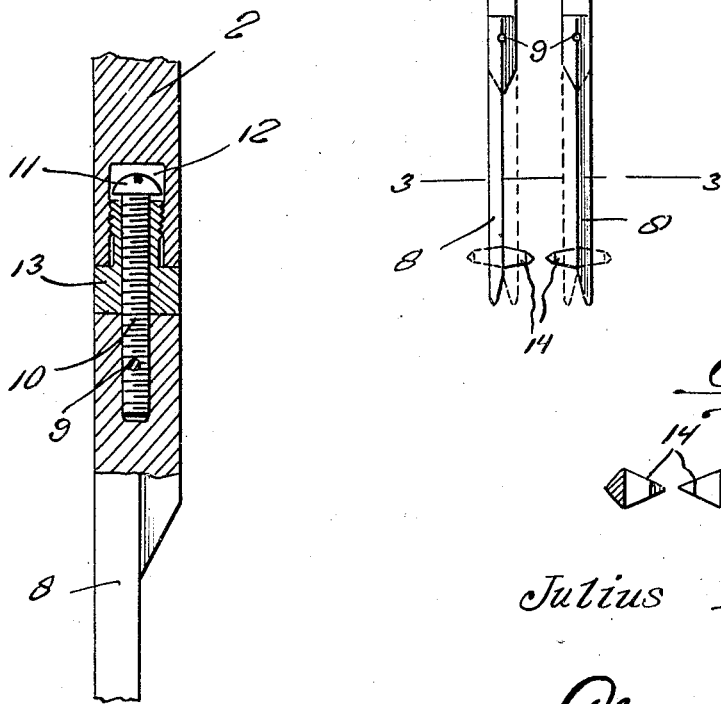
Inventor
Julius Doyon, Jr.
By Clarence A. O'Brien
                    Attorney Patented Nov. 10, 1931

1,830,827

UNITED STATES PATENT OFFICE

JULIUS DOYON, JR., OF BERLIN, NEW HAMPSHIRE

CALIPERS

Application filed August 13, 1928. Serial No. 299,200.

The object of my present invention is the provision of calipers which, while simple and inexpensive in construction are possessed of a wide range of usefulness.

Other objects and practical advantages of the invention will be fully understood from the following description and claims when the same are read in connection with the drawings, accompanying, and forming a part of this application, and in which:

Figure 1 is an elevation of calipers constituting the best practical embodiment of my invention of which I am cognizant.

Figure 2 is an enlarged detail section hereinafter explicitly referred to and showing construction that is hidden in Figure 1.

Figure 3 is a cross section on line 3—3 of Figure 1.

Similar numerals of reference designate corresponding parts in both views of the drawings.

The body of my novel calipers comprises a resilient bow 1 and legs 2, one of the legs 2 being provided with an aperture 3, of adequate size, for the passage of a threaded rod 4, that is appropriately connected as at 5 to the other leg 2.

Mounted on the rod 4 and engaging the threads thereof is a nut 6, with a knurled portion 7, said nut being designed to retain the legs 2 in the positions desired against the resiliency of the bow 1 which causes the legs 2 to tend to move away from each other.

My improved device also includes dividers 8.

Fixed with respect to the caliper members 8, preferably by rivets 9, are threaded rods 10 on which are heads 11, disposed in sockets 12 in the legs 2.

Threaded in the sockets 12 of the legs 2 are interiorly threaded sleeves 13 which receive and engage the threaded rods 10 and have lower enlargements opposed to the lower ends of the legs 2, Figure 2.

The caliper members 8 are provided with toes 14, and when the said toes are directed inwardly the rods 10 and their heads 11 rest as shown in Figure 2 relatively to the sleeves 13. When, however, the members 8 are turned by hand through a half revolution to place the toes 14 in outwardly directed positions the heads 11 will bring up against the upper ends of the sleeves 13 and stop the members 8. It will also be noted that when the members 8 are turned back through a half revolution to direct the toes 14 inwardly, the upper ends of the members 8 by bringing up against the lower ends of the sleeves 13 will stop the members 8.

From the foregoing it will be readily understood that the calipers may be expeditiously and easily adapted for outside measurements and inside measurements; also, that the novel construction effecting connection between the legs 2 and the members 8 is simple and compact and well adapted to withstand the usage to which calipers are ordinarily subjected.

Having thus described my invention, what I claim as new and desire to secure by Letters Patent is:—

1. Calipers having legs and a socket in each leg, resilient means tending to move the legs away from each other, adjustable means for holding the legs against movement away from each other, caliper members, of inside and outside type, a rod fixed to each of said members and having a head disposed in the socket of its corresponding leg and means connecting the legs and rods and adapted to limit turning of the caliper members about their axes.

2. Calipers having legs and a socket in each leg, resilient means tending to move the legs away from each other, adjustable means for holding the legs against movement away from each other, caliper members of inside and outside type, a threaded rod fixed to each of said members and having a head disposed in the socket of its corresponding leg, and means engaging and connecting the legs and rods and adapted to limit turning of the members about their axes, the last named means being in the form of threaded sleeves receiving and engaging the rods and fixed to the legs.

3. In calipers and in combination, a leg having a socket, a caliper member of inside and outside type, a rod fixed to said caliper member and having a head disposed in said socket of the leg, and means connecting the leg and rod and adapted to limit turning of the caliper member about its axis.

In testimony whereof I affix my signature.

JULIUS DOYON, Jr.